US007848040B2

(12) United States Patent
Yamamoto

(10) Patent No.: US 7,848,040 B2
(45) Date of Patent: Dec. 7, 2010

(54) MAGNETIC RECORDING DISK AND DISK DRIVE WITH AMPLITUDE-TYPE SERVO FIELDS HAVING PATTERNED ALTERNATING-POLARITY SERVO ISLANDS FOR READ/WRITE HEAD POSITIONING

(75) Inventor: Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 644 days.

(21) Appl. No.: 11/840,900

(22) Filed: Aug. 17, 2007

(65) Prior Publication Data

US 2009/0046385 A1 Feb. 19, 2009

(51) Int. Cl.
*G11B 5/09* (2006.01)
(52) U.S. Cl. .................. 360/48; 360/53; 360/75; 360/77.02; 360/78.04
(58) Field of Classification Search ................. None
See application file for complete search history.

(56) References Cited

U.S. PATENT DOCUMENTS

| | | | | | |
|---|---|---|---|---|---|
| 4,549,232 | A | * | 10/1985 | Axmear et al. | ........... 360/77.07 |
| 4,912,585 | A | * | 3/1990 | Belser et al. | ................ 360/135 |
| 5,587,223 | A | | 12/1996 | White | |
| 5,820,769 | A | | 10/1998 | Chou | |
| 6,383,598 | B1 | | 5/2002 | Fullerton et al. | |
| 6,490,117 | B1 | | 12/2002 | Sacks et al. | |
| 6,754,016 | B2 | | 6/2004 | Messner et al. | |
| 6,754,017 | B2 | * | 6/2004 | Rettner et al. | ................ 360/51 |
| 6,980,349 | B1 | * | 12/2005 | Huibers et al. | .............. 359/291 |
| 6,980,389 | B1 | * | 12/2005 | Kupferman | .............. 360/77.08 |
| 7,019,925 | B2 | * | 3/2006 | Ehrlich | ........................ 360/48 |
| 7,167,329 | B2 | * | 1/2007 | Baker | ......................... 360/55 |
| 7,345,838 | B2 | * | 3/2008 | Sakurai et al. | ................ 360/48 |
| 7,440,224 | B2 | * | 10/2008 | Ehrlich et al. | ............ 360/77.08 |
| 7,492,540 | B2 | * | 2/2009 | Albrecht | ....................... 360/51 |
| 7,532,423 | B2 | * | 5/2009 | Kaizu et al. | ................... 360/48 |

(Continued)

OTHER PUBLICATIONS

Lin, et al., "Investigation of advanced position error signal patterns in patterned media", J. Appl. Phys., vol. 87, No. 9, May 1, 2000, pp. 5117-5119.

(Continued)

*Primary Examiner*—Dismery E Mercedes
(74) *Attorney, Agent, or Firm*—Thomas R. Berthold

(57) ABSTRACT

A magnetic recording disk drive has a disk with pre-patterned nondata servo sectors extending generally radially across the data tracks for use in positioning the read/write heads on the data tracks. The servo sectors include a synchronization pattern of generally radially directed magnetized marks, a first field of generally radially directed magnetized stripes, and a second field of generally radially directed magnetized stripes. Each stripe in each of the two fields comprises a plurality of radially spaced discrete islands, each island having a radial height of approximately Tp, where Tp is the spacing of the track centerlines in the radial direction. In the first field, the islands are centered at a track centerline, and in the second field the islands are centered at the midline between two adjacent track centerlines. The marks and islands are discrete magnetized regions separated by nonmagnetic spaces. The marks in the synchronization pattern and the stripes in the two fields have alternating polarity of magnetizations in the along-the-track direction.

19 Claims, 10 Drawing Sheets

U.S. PATENT DOCUMENTS

| | | | | |
|---|---|---|---|---|
| 7,612,961 | B2* | 11/2009 | Yamamoto | 360/48 |
| 7,643,234 | B2* | 1/2010 | Albrecht et al. | 360/48 |
| 7,652,839 | B2* | 1/2010 | Albrecht et al. | 360/75 |
| 7,729,073 | B2* | 6/2010 | Yamamoto | 360/48 |
| 2003/0107833 | A1* | 6/2003 | Rettner et al. | 360/48 |
| 2004/0252394 | A1* | 12/2004 | Hamaguchi et al. | 360/48 |
| 2006/0007569 | A1* | 1/2006 | Komine et al. | 360/17 |
| 2006/0028750 | A1* | 2/2006 | Sakurai et al. | 360/48 |
| 2006/0050426 | A1* | 3/2006 | Kaizu et al. | 360/15 |
| 2006/0280975 | A1 | 12/2006 | Albrecht et al. | |

OTHER PUBLICATIONS

Baker, "Direct print servo patterns for disk drive", J. Appl. Phys., vol. 97, 10P105 (2005).

* cited by examiner

MAGNETIC RECORDING DISK AND DISK DRIVE WITH AMPLITUDE-TYPE SERVO FIELDS HAVING PATTERNED ALTERNATING-POLARITY SERVO ISLANDS FOR READ/WRITE HEAD POSITIONING

BACKGROUND OF THE INVENTION

1. Field of the Invention

This invention relates generally to patterned-media magnetic recording disks, wherein each data bit is stored in a magnetically isolated data island on the disk, and more particularly to a patterned-media disk and disk drive with patterned nondata servo fields for head-positioning.

2. Description of the Related Art

Magnetic recording hard disk drives with patterned magnetic recording media have been proposed to increase the data density. In patterned media, the magnetic recording layer on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. Alternatively, the patterned media may be fabricated so that that there is no magnetic material in the spaces between the islands. U.S. Pat. Nos. 5,820,769; 5,587,223; and 6,383,598 are representative of various types of patterned media and their methods of fabrication.

Like conventional non-patterned or continuous-media disks, patterned-media disks also have nondata servo regions that are used for read/write head positioning. The nondata servo regions in patterned-media disks contain servo blocks or islands separated by nonmagnetic spaces. The servo blocks form a servo pattern that generates a servo readback signal that is demodulated into a position error signal (PES) for positioning the read/write head to the desired data track and maintaining it on track. The proposed method for formatting this type of disk is to DC "erase" the disk during manufacturing with a large magnet, leaving all of the servo islands magnetized in the same direction. Thus for a patterned-media perpendicular magnetic recording disk, all of the servo islands would have a magnetization direction either "into" or "out of" the surface of the disk. However, because only a single polarity of magnetization is used with this method, half of the available signal amplitude from the servo islands is sacrificed and thus the signal-to-noise ratio (SNR) is less than optimum. Pending application Ser. No. 11/148,918, published as US2006/0280975 A1 and assigned to the same assignee as this application, describes a magnetic recording disk with discrete servo islands having alternating polarity in the along-the-track direction and patterned into four separate fields so as to form a conventional amplitude-type quadrature servo pattern. The amplitudes of the readback servo signal in the four fields are demodulated to generate the PES.

What is needed is a patterned-media magnetic recording disk with nondata servo islands that have alternating polarity of magnetization to provide optimal SNR, but also form an improved amplitude-type servo pattern that is relatively easy to demodulate into a PES.

SUMMARY OF THE INVENTION

The invention relates to a magnetic recording disk drive and disk, with the disk having pre-patterned nondata servo sectors extending generally radially across the data tracks. The servo sectors include a synchronization pattern of generally radially directed magnetized marks, a first field of generally radially directed magnetized stripes, and a second field of generally radially directed magnetized stripes. Each stripe in each of the two fields comprises a plurality of radially spaced discrete islands, each island having a radial height of approximately Tp, where Tp is the spacing of the track centerlines in the radial direction. In the first field, the islands are centered at a track centerline, and in the second field the islands are centered at the midline between two adjacent track centerlines. The marks in the synchronization pattern and the stripes in the two fields have alternating polarity of magnetizations in the along-the-track direction.

The disk may be a patterned-media disk with both pre-patterned data islands and pre-patterned nondata servo sectors, a continuous-media disk with conventional continuous-media data tracks and pre-patterned nondata servo sectors, or a continuous-media disk with discrete data tracks and pre-patterned nondata servo sectors.

The disk drive includes servo electronics that measures the amplitude of the readback servo signal from the synchronization pattern, and the average amplitudes of the readback servo signal from each of the two fields. A main position error signal (mPES) is calculated from the average amplitude from one of the fields and a substitute position error signal (sPES) is calculated from the average amplitude from the other field. The PES is calculated using one or the other of the mPES and sPES.

For a fuller understanding of the nature and advantages of the present invention, reference should be made to the following detailed description taken together with the accompanying figures.

DETAILED DESCRIPTION OF THE INVENTION

Figure 1A:
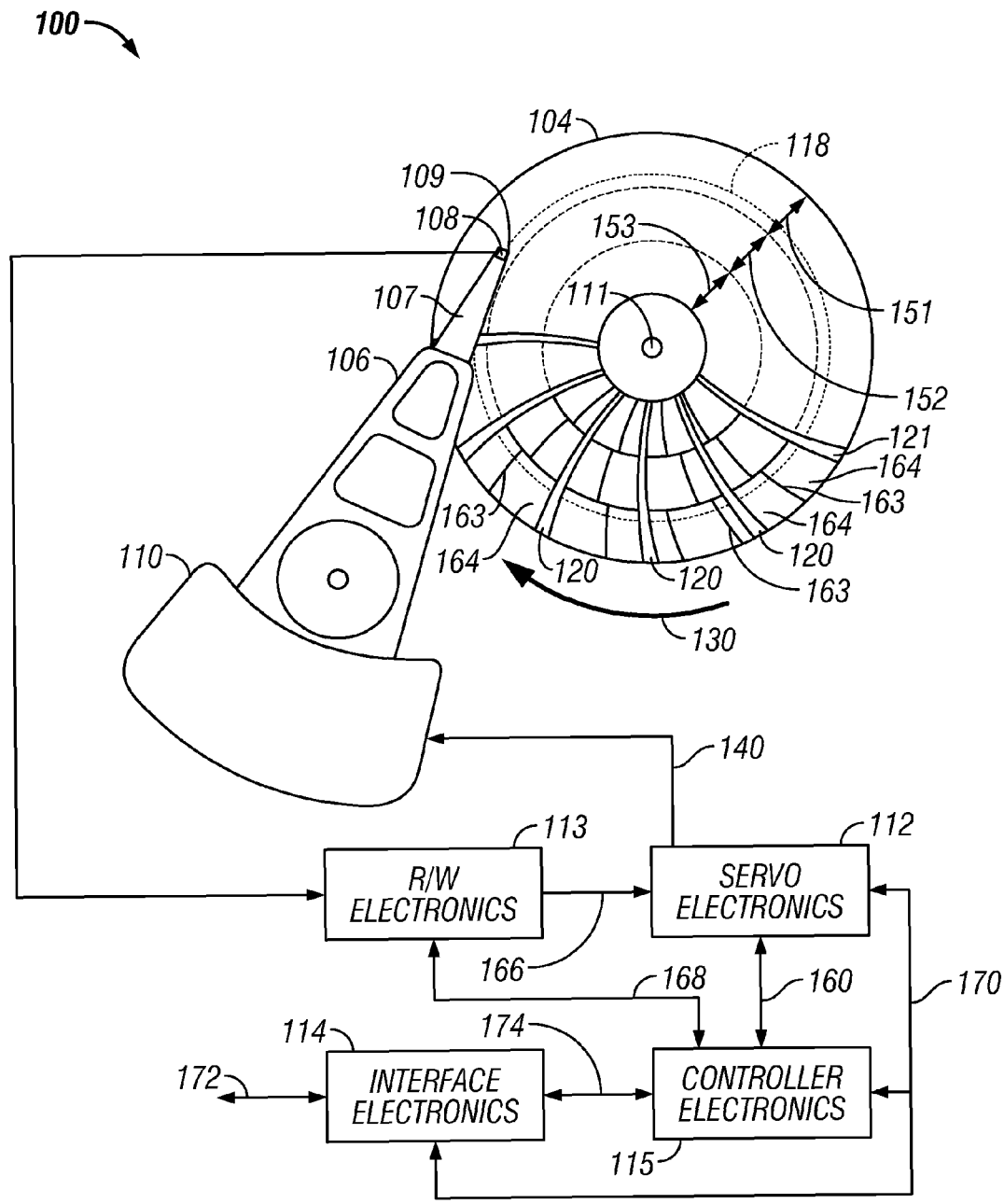
FIG. 1 is a schematic of a conventional magnetic recording disk drive illustrating the magnetic recording disk with nondata servo sectors and synchronization fields.

FIG. 1 is a schematic of a conventional magnetic recording disk drive and illustrates the magnetic recording disk with the nondata regions, specifically the servo sectors for positioning the recording heads on the data tracks and the synchronization fields for enabling the recording heads to read and write data in the data sectors. The disk drive, designated generally as 100, includes the magnetic recording disk 104, a radial voice coil motor (VCM) actuator 110, an actuator arm 106, a suspension 107, a head carrier or air-bearing slider 108 and a recording head 109. The recording head 109 is typically a combination of an inductive write head with a magnetoresistive read head (also called a read/write head) and is located on the trailing end or end face of slider 108. Slider 108 is supported on the actuator arm 106 by a suspension 107 that enables the slider to "pitch" and "roll" on an air-bearing generated by the disk 104 as it rotates in the direction of arrow 130. Only one disk surface with associated slider and recording head is shown in FIG. 1, but there are typically multiple disks stacked on a hub that is rotated by a spindle motor, with a separate slider and recording head associated with each surface of each disk.

Figure 2:
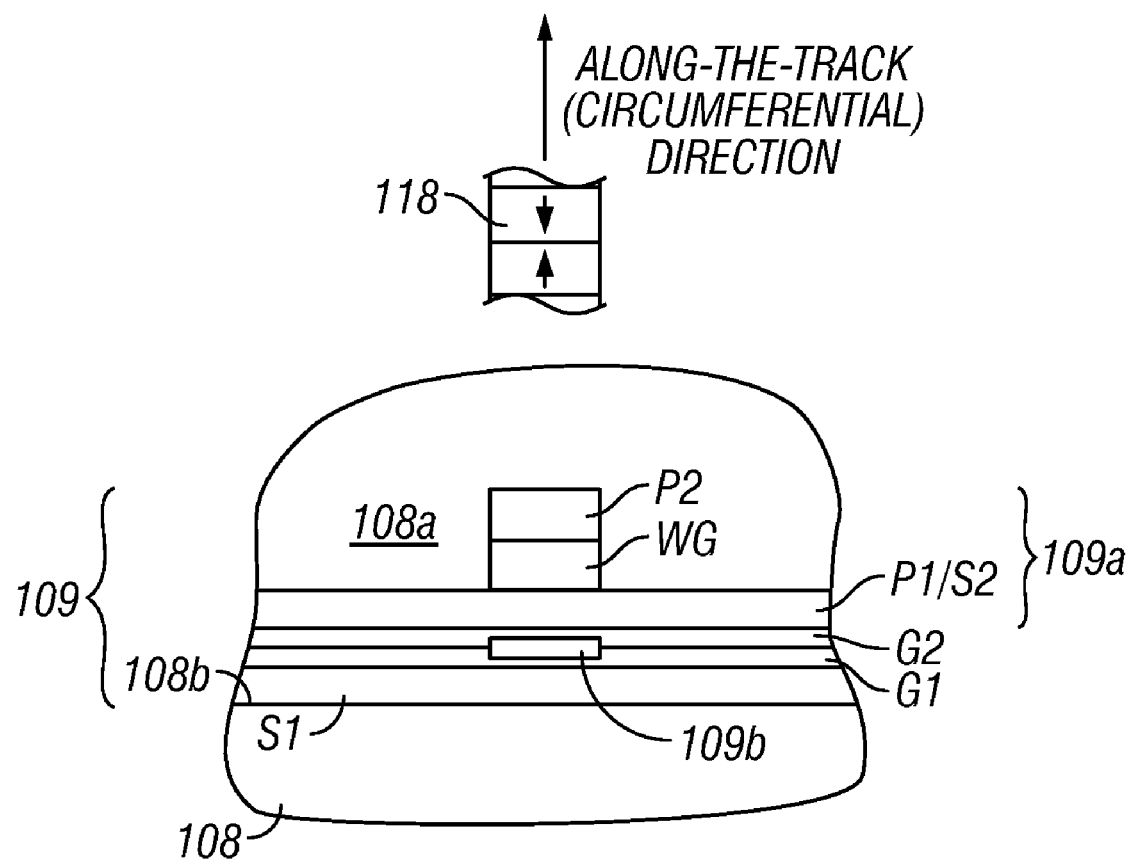
FIG. 2 is a view showing the disk-facing surface of the disk-drive slider with the ends of the read/write head and a portion of a data track as viewed from the surface of the disk.

FIG. 2 is a view showing the disk-facing surface 108a of slider 108 and the ends of head 109 as viewed from the surface of disk 104 superimposed with a portion of data track 118. The head 109 is a read/write head and is a series of thin films deposited and lithographically patterned on the end face 108b of slider 108. The write head 109a includes magnetic write poles P1/S2 and P1 separated by a write gap WG. When write current is directed to the write head 109a a magnetic field is generated across WG in a direction along the data track 118. The magnetoresistive sensor or read head 109b is located between two insulating gap layers G1, G2. Gap layers G1, G2 are located between magnetic shields S1 and P1/S2, with P1/S2 also serving as the first write pole for the write head 109a. Because shield S2 also serves as the pole P1, this type of read/write head is known as a "merged" head. If S2 and P1 are separate layers the read/write head is known as a "piggyback" head. Because the films making up head 109 are deposited sequentially on end face 108b of slider 108, there is a spacing D in the along-the-track or circumferential direction between the read head 109b and the write gap WG of write head 109a. The write head 109a depicted in FIG. 2 is a horizontal-recording write head for recording magnetizations in the plane of the recording layer on disk 104, as shown by the arrows in the section of data track 118. However, the write head may also be a perpendicular-recording write head with a perpendicular write pole (WP) that records magnetizations perpendicular to the recording layer on disk 104.

Referring again to FIG. 1, the disk 104 has a center of rotation 111 and is rotated in direction 130. The disk 104 has a magnetic recording layer with radially-spaced concentric data tracks, one of which is shown as track 118. Each data track has a reference index 121 indicating the start-of-track. The disk drive is illustrated as a zone-bit-recording (ZBR) disk drive because the data tracks are grouped radially into a number of annular data bands or zones, three of which are shown as zones 151, 152 and 153, but the invention is fully applicable to a disk drive that does not use ZBR, in which case the disk drive would have only a single data zone. Within each zone, the tracks are also circumferentially divided into a number of data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164.

Each data track also includes a plurality of circumferentially or angularly-spaced servo sectors 120 that contain positioning information detectable by the read head for moving the head 109 to desired data tracks and maintaining the head 109 on the data tracks. The servo sectors in each track are aligned circumferentially with the servo sectors in the other tracks so that they extend across the tracks in a generally radial direction, as represented by generally radially-directed servo sectors 120. The servo sectors 120 have a generally arcuate shape in the generally radial direction that generally replicates the path of the head 109 as it is moved across the disk by the radial actuator 110. The servo sectors 120 are nondata regions on the disk that are magnetized once, typically during manufacturing or formatting of the disk, and are not intended to be erased during normal operation of the disk drive.

The electronics associated with disk drive 100 include read/write (R/W) electronics 113, servo electronics 112, controller electronics 115 and interface electronics 114. In the operation of disk drive 100, the R/W electronics 113 receives signals from head 109 and passes servo information from the servo sectors 120 to servo electronics 112 and data signals from the data sectors 164 to controller electronics 115. Servo electronics 112 uses the servo information to produce a current at 140 that drives VCM actuator 110 to position head 109. Interface electronics 114 communicates with a host system (not shown) over interface 172, passing data and command information. Interface electronics 114 also communicates with controller electronics 115 over interface 174. In the operation of disk drive 100, interface electronics 114 receives a request for reading from or writing to the data sectors 164 over interface 172. Controller electronics 115 receives a list of requested data sectors from interface electronics 114 and converts them into a set of numbers that uniquely identify the disk surface, track and data sector. The numbers are passed to servo electronics 112 to enable positioning head 109 to the appropriate data sector.

If the disk drive is a "headerless" architecture disk drive, meaning that the data sectors 164 do not contain unique data sector addresses that are required to be read before data can be read from or written to the data sectors, then once the servo electronics 112 has positioned head 109 over the appropriate data track, servo electronics 112 begins executing sector computations to locate and identify the desired data sector. In brief, in the headerless architecture approach, a servo timing mark (STM) at the beginning of the servo sectors 120 is used to locate servo sectors, and a count of STMs from a servo sector containing an index mark 121 uniquely identifies each servo sector. Once the desired data sector is thus identified, the sync field preceding that data sector is detected to control the timing of data bits read from the data sector or data bits written to the data sector.

Conventional magnetic recording disk drives use disks with "continuous" media, meaning that the magnetic recording layer is a continuous film of magnetizable material. In conventional continuous-media disks the concentric data tracks are not physically separated from one another and are not pre-formed in the recording layer, but are formed when the write fields from the write head create the magnetizations in the continuous magnetic layer. A continuous-media disk may also be a "discrete-track" disk, meaning that the concentric data tracks of continuous magnetic material are radially separated from one another by concentric nonmagnetic guard bands. Discrete-track magnetic recording disks are known in the art, as described for example in U.S. Pat. No. 4,912,585. In a discrete-track disk, the nonmagnetic guard bands may be trenches or grooves, or formed of nonmagnetic material, or contain magnetic material but have surfaces far enough below the surfaces of the data tracks to not adversely the readback signals from the data tracks.

However, magnetic recording disks with "patterned" media have been proposed to increase the data density. In patterned media, the magnetizable material on the disk is patterned into small isolated islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In patterned media, the data sectors as well as the nondata regions are patterned. However, it is also possible to fabricate a continuous-media disk wherein just the nondata regions are patterned. This type of continuous-media disk may have either conventional concentric data tracks, or discrete data tracks separated by nonmagnetic guard bands, but the nondata regions are patterned. An example of a discrete-track disk with patterned servo regions is described in U.S. Pat. No. 4,912,585.

Figure 3:
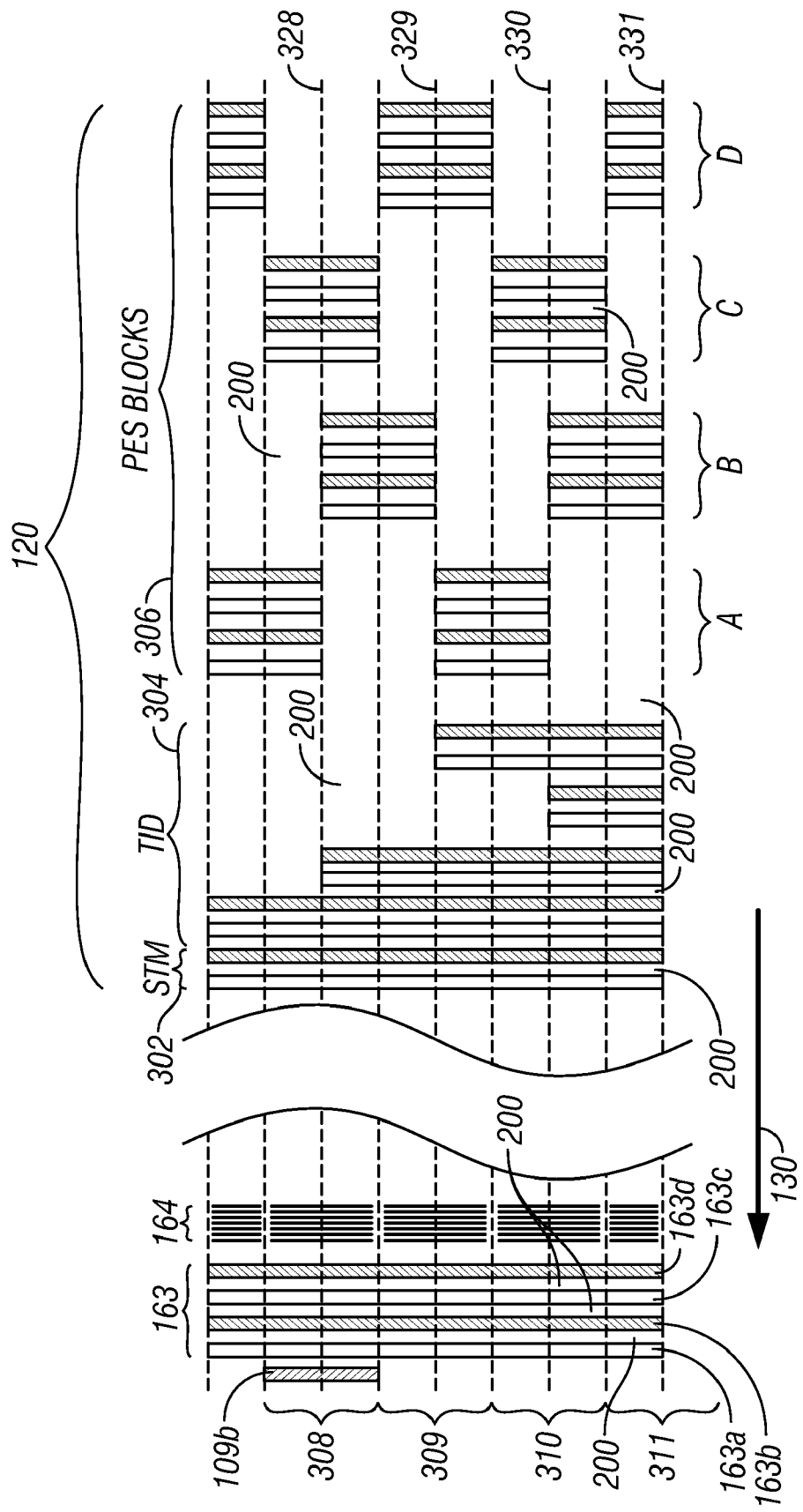
FIG. 3 is a schematic showing a portion of a patterned-media disk with a patterned sync field and a patterned servo sector spanning several data tracks with nondata islands having alternating polarity in the along-the-track direction.

FIG. 3 is a schematic showing a portion of a patterned-media disk with a patterned sync field 163 and a patterned servo sector 120 spanning several data tracks, as described in pending application Ser. No. 11/148,918, published as US2006/0280975 A1 and assigned to the same assignee as this application. Four full data tracks are depicted: 308, 309, 310 and half-track 311, each having a respective track centerline 328, 329, 330 and 331. The read head 109b is shown as positioned in data track 308 and will detect the islands in sync field 163 and servo sector 120 as the disk rotates in the direction of arrow 130.

The sync field 163 is depicted as a pattern with four sync marks or radial stripes as magnetized nondata islands 163a-163d separated by nonmagnetic spaces. The sync marks are stripes that extend across the data tracks in the radial direction, resulting in a single-frequency pattern suitable for locking a phase-locked-loop data clock prior to reading or writing data bits in the data sectors. The sync field 163 precedes the data sector 164, which shows several data islands, represented as solid lines.

The servo sector 120 is a conventional servo pattern of the type commonly used in sector servo systems and shows a greatly simplified pattern for clarity. The servo pattern includes several fields containing nondata islands, three of which are shown as servo-timing-mark (STM) field 302, track ID (TID) field 304 and position-error-signal (PES) field 305 depicted as the well-known amplitude-type quadrature pattern of PES bursts A-D. The islands in each burst or field A-D are used to determine the fractional part of the radial position of the head. When the head is at the track centers the read-back signal amplitudes from the A islands and the B islands are equal. When the head is at the half-track positions the amplitudes from the C islands and the D islands are equal. As the head moves off-track the amplitudes from all the islands will increase or decrease. The amplitudes of the PES islands are decoded in servo electronics 112 and used to reposition the head.

In FIG. 3 all of the islands in sync field 163, data sector 164 and servo sector 120 are discrete islands of magnetic material. Alternating islands (shown with cross-hatching) are magnetized in the opposite direction to the magnetization of the other islands. Thus the magnetizations in the non-cross-hatched islands are antiparallel to the magnetizations in the cross-hatched islands. For perpendicular recording, if the magnetizations in the non-cross-hatched islands are out-of-the paper in FIG. 3, then the magnetizations in the cross-hatched islands would be into-the-paper. For horizontal recording, if the magnetizations in the non-cross-hatched islands are to the right in the along-the-track direction in FIG. 3, then the magnetizations in the cross-hatched islands would be to the left. Each discrete island is a magnetized island separated from other islands by nonmagnetic spaces represented as 200. The term "nonmagnetic" means that the spaces 200 between the islands are formed of a nonferromagnetic material, such as a dielectric, or a material that has no substantial remnant moment in the absence of an applied magnetic field, or a magnetic material in a groove or trench recessed far enough below the islands to not adversely affect reading or writing. The nonmagnetic spaces 200 may also be the absence of magnetic material, such as grooves or troughs in the magnetic recording layer or disk substrate.

As shown schematically in FIG. 3, the PES blocks in servo sector 120 have a frequency (servo frequency) substantially lower than the data frequency (the frequency of the data islands in data sector 164). This is because for a given resolution of the read head 109b, modern partial-response (PR) read channel in R/W electronics 113 can handle linear bit densities with a period several times greater than the resolution of the read head. However, to clearly resolve individual pulses, which is beneficial for data synchronization and PES decoding, the period of the nondata servo islands should be close to the resolution of the read head. Near the inside diameter (ID) of the disk, the servo frequency will be closer to the data frequency, but the frequency of both will be limited by the maximum linear density of the disk. However, with increasing radial position from the ID, the data frequency increases relative to the servo frequency because the servo frequency is constant and the data frequency increases generally linearly with radius.

Figure 4A:
FIG. 4(a) is a representative signal from a single perpendicularly magnetized nondata island.
Figure 4B:
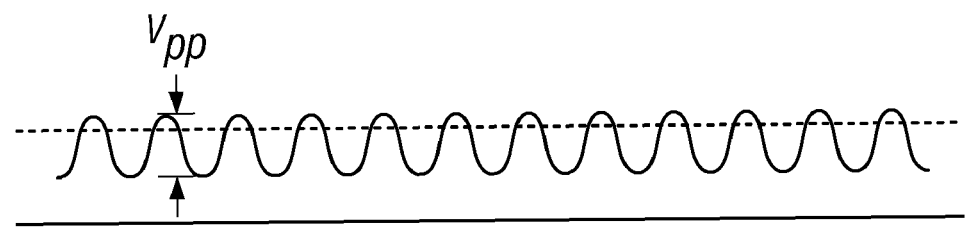
FIG. 4(b) is a representative signal from a series of nondata islands if all the islands were magnetized in the same perpendicular direction so that their magnetizations had a single polarity.
Figure 4C:
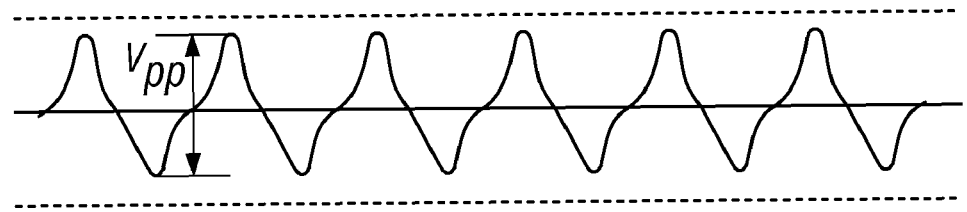
FIG. 4(c) is a representative signal from a disk according to the present invention with the nondata islands having alternating perpendicular magnetization directions so that two adjacent islands along a track have opposite polarity.

FIG. 4(a) is representative of the signal detected by read head 109b a single magnetized nondata island of FIG. 3 passes the read head. The isolated pulse response $V_p$ shown is for a perpendicularly-magnetized island. If the nondata islands repeat with a certain period, and all islands were not magnetized with alternating polarity as in FIG. 3, but were magnetized in the same perpendicular direction so that their magnetizations had a single polarity, then a series of pulses as shown in FIG. 4(b) would be detected by read head 109b. Note that the peak-to-peak amplitude $V_{pp}$ is smaller than the isolated pulse response $V_p$. However, when the nondata islands are magnetized in the alternating perpendicular directions so that two adjacent islands have opposite polarity, then a series of pulses as shown in FIG. 4(c) will be detected by read head 109b. Note that the peak-to-peak amplitude $V_{pp}$ in FIG. 4(c) is more than double the peak-to-peak amplitude $V_{pp}$ in FIG. 4(b). If most of the noise in the recording system is not data-dependent, and therefore constant between the examples of FIGS. 4(b) and 4(c), then the signal-to-noise ratio will be significantly better for the example of FIG. 4(c) with alternating polarity. Because the instantaneous signal-to-noise ratio can be traded off against the length of the pattern, it will be possible to achieve the desired performance targets with shorter data sync and servo patterns, leaving more disk real estate for data sectors.

This invention relates to a disk and disk drive with a servo pattern comprising patterned nondata islands having alternating polarity like that shown in FIG. 3, but in which a synchronization field or pattern is used together with an improved and shortened amplitude-type PES field to generate the PES. The disk may be a patterned-media disk with both pre-patterned data islands and pre-patterned nondata islands, a continuous-media disk with conventional continuous-media data tracks and pre-patterned nondata islands, or a continuous-media disk with discrete data tracks and pre-patterned nondata islands.

Figure 5:
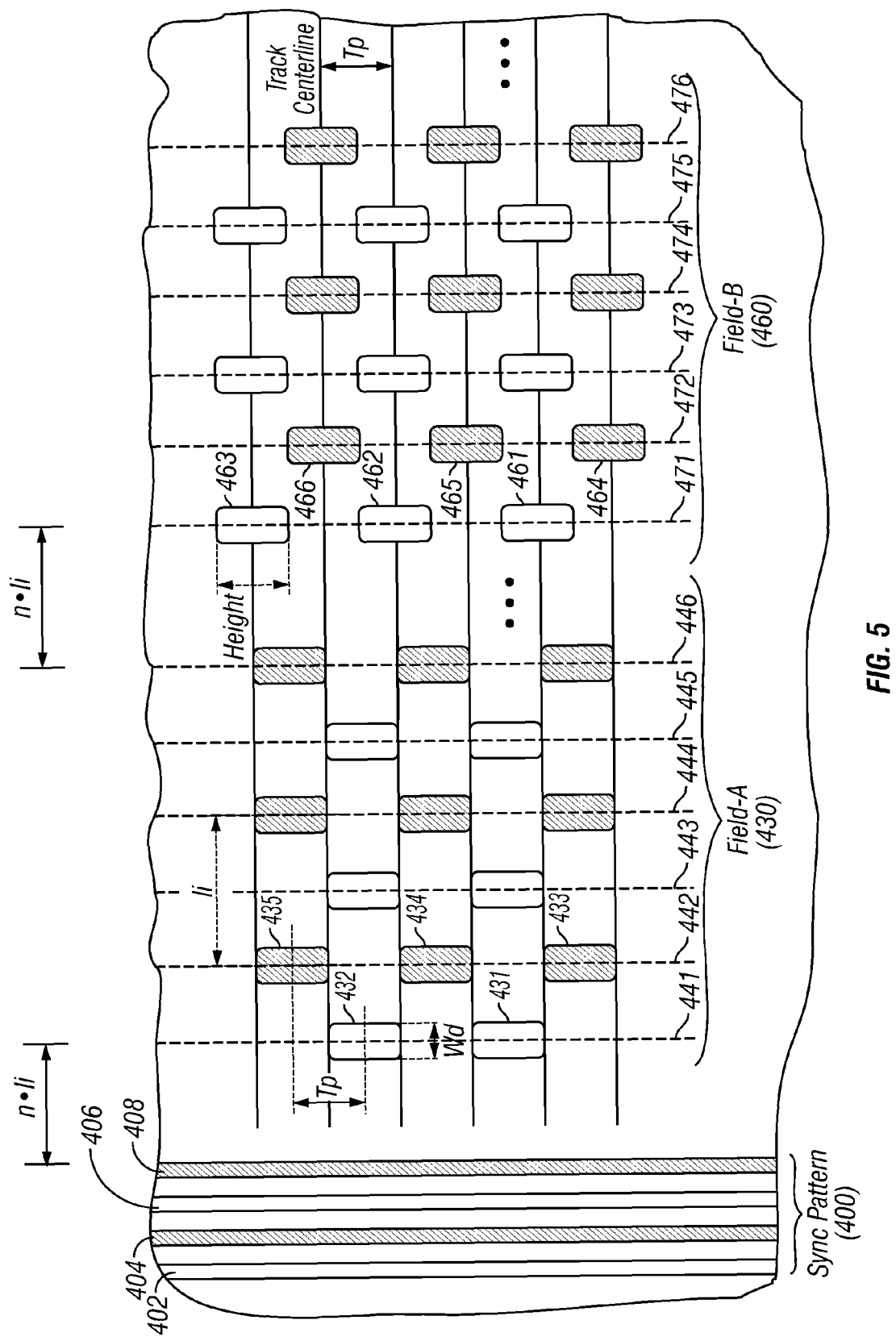
FIG. 5 is an illustration of the position error signal (PES) field according to the present invention with the synchronization pattern and PES bursts or fields A and B with rectangularly shaped islands.

In this invention, a portion of the servo sector is shown in FIG. 5 and includes synchronization (or "sync") field or pattern 400 (like item 163 in FIG. 3) and two PES fields identified as Field A (item 430) and Field B (item 460). The term "synchronization pattern" is used for convenience herein and is not meant to imply that the radial "synchronization marks" are the same ones used for synchronizing the head for reading and writing of data (like item 163 in FIG. 3). Any pattern with the required circumferential interval between the radial marks will function with this demodulation method that uses only the two fields A and B. The elimination of two of the PES fields (Fields C and D in FIG. 3) reduces the amount of disk space needed for servo information, thus increasing the amount of disk space available for data.

In FIG. 5 each horizontal dotted line represents a single track centerline. The sync pattern 400 includes magnetized radial marks 402, 404, 406, 408 separated by nonmagnetic spaces. Field-A 430 is shown with six generally radially directed stripes 441, 442, 443, 444, 445 and 446, with each stripe having discrete magnetized islands, like representative islands 431, 432 in stripe 441 and islands 433, 434, 435 in stripe 442. The pattern of Field-B 460 is identical to the pattern of Field-A 430 with the exception that all the islands are shifted radially by one-half the track pitch (Tp), which is equal to the track width and the radial spacing between adjacent track centerlines. Thus Field-B 460 is shown with six generally radially directed stripes 471, 472, 473, 474, 475 and 476, with each stripe having discrete islands, like representative islands 461, 462, 463 in stripe 471 and islands 464, 465, 466 in stripe 472. The marks in sync pattern 400 and the stripes in Field-A 430 and Field-B 460 extend in the generally radial direction across the disk and preferably have an arcuate shape that generally replicates the path of the head as it is moved across the disk by the radial actuator (as shown by servo sectors 120 in FIG. 1A). The spaces between the sync marks, the stripes and the islands are nonmagnetic spaces. The marks in sync pattern 400 and the stripes in Field-A 430 and Field-B 460 have alternating polarity in the circumferential or along-the-track direction, with the different polarities being represented by cross-hatching and non-cross-hatching.

Figure 6:
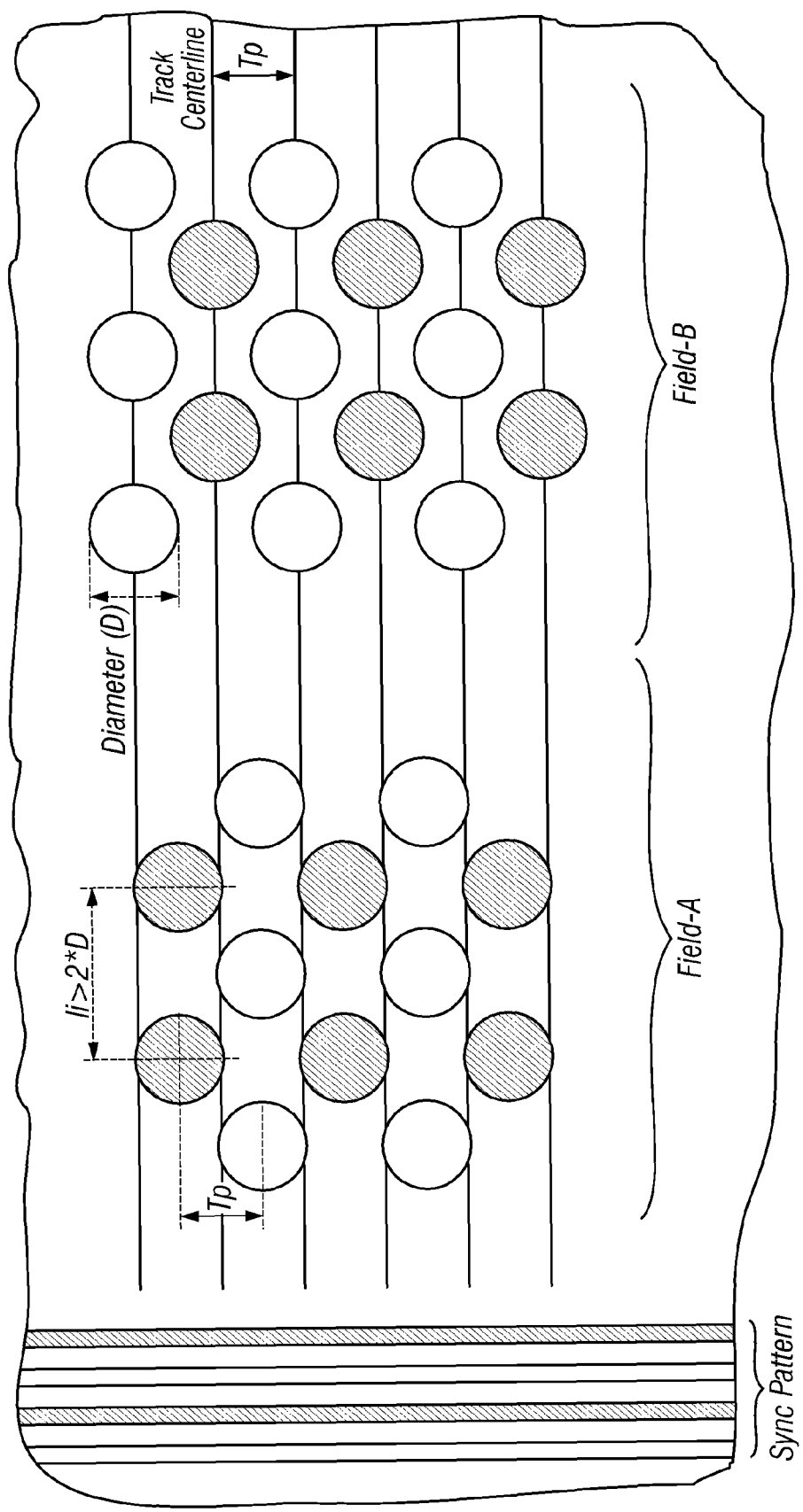
FIG. 6 is an illustration of the position error signal (PES) field according to the present invention with the synchronization pattern and PES bursts or fields A and B with circularly shaped islands.

The island shape in FIG. 5 is generally that of a rectangle, with slightly rounded corners as a result of the fabrication process. However, the islands can have a shape other than a rectangle. Also in FIG. 5, the island height in the radial direction is shown as being approximately equal to Tp. However, the island radial height can be slightly greater or less than Tp. FIG. 6 shows an example of a portion of a servo sector with the sync pattern and Fields A and B, where the island shape is generally that of a circle and the island height (the circle diameter) is slightly greater than Tp. In FIGS. 5 and 6, there are six stripes in each Field-A and Field-B. The number of stripes depends on the how much noise the pattern's read back signal has. If there are more stripes in each field, the readback signal can be averaged based on more sampling data, which increases the cancellation of noise. The circumferential interval "Ii" between islands is the same at one radial location, and this interval is proportional to the radial distance "r" from the center of the disk. This means essentially that the radial stripes in Field A and Field B, as well as the sync marks in sync pattern, are generally equally angularly spaced apart. This results in generally a constant frequency for the servo readback signal across the entire disk (or data zone if the disk has multiple annular data bands or zones). The pattern dimension depends on the design track pitch Tp and the read head geometry and characteristics. In the examples of FIGS. 5 and 6, Tp is 39 nm, and the island interval Ii at this particular radial location is 100 nm. The island width (Wd) in the circumferential be less than one-half the island circumferential interval (Ii). A simulation has demonstrated that Wd=¼*Ii produces good results.

As shown in FIG. 5, the sync marks and the stripes are placed at the circumferential interval Ii. The interval between the last sync mark 408 and the first stripe 441 at the boundary between the sync pattern 400 and Field-A is defined as n*Ii. Similarly, the interval between the last stripe 446 in Field-A and the first stripe 471 in Field-B is also defined as n*Ii. The multiple "n" is an integer and is preferably 1. The circumferential boundary interval n*Ii is also proportional to the pattern's radial distance "r" from the center of the disk.

PES demodulation is done by an amplitude measurement method. The Field-A pattern is used for creating the "mPES" (main position error signal), which is proportional to the read head offset from the track centerline. The Field-B pattern is used for creating the "sPES" (substitute position error signal), which is proportional to the read head offset from the midpoint of two adjacent tracks. By using mPES and sPES, the position error signal can cover the read head offset in the entire track width.

The mPES and sPES are given by the following equations:

$$mPES = gain\_h * (Avg\_A - Avg\_Sync)/(Amp\_Sync) \quad \text{Equation (1)}$$

$$sPES = gain\_h * (Avg\_B - Avg\_Sync)/(Amp\_Sync) \quad \text{Equation (2)}$$

In Equations (1) and (2) "gain_h" is a slope correction factor; "Avg_A" and "Avg_B" are the averages of the readback signal from Field-A and Field-B, respectively; "Avg_Sync" is the average of the readback signal from the sync pattern; and "Amp_Sync" is the amplitude of the readback signal at the primary frequency of the sync pattern. The "Avg" terms are DC components of the readback signal. Ideally, "Avg_Sync" is 0. The term "Amp_Sync" is the AC component of the primary frequency of the readback signal from the sync pattern. It is used to normalize the PES value so that the PES value is stable even if the sensitivity of the read head changes. In actual implementation, the readback signal is sampled at a rate of some integer multiple of the readback signal frequency. The primary frequency of the readback signal is usually measured by a Discrete Fourier Transform (DFT) calculation.

The "gain_h" slope correction factor allows the demodulated mPES and sPES to be connected smoothly as a straight line for the entire track width. The value of "gain_h" depends primarily on "Ii" and the size and shape of the islands. To cover the entire disk, "gain_h" is calibrated for different pattern radial locations for some range of tracks, e.g., every 10,000 tracks. This "gain_h" calibration is very similar to the calibration for the conventional quadrature burst amplitude pattern. The demodulated PES is proportional to radial movement of the read head, and this relationship is close to linear. By applying the slope correction "gain_h", the demodulated mPES and sPES can be connected smoothly as a line across the entire track width.

Figure 7:
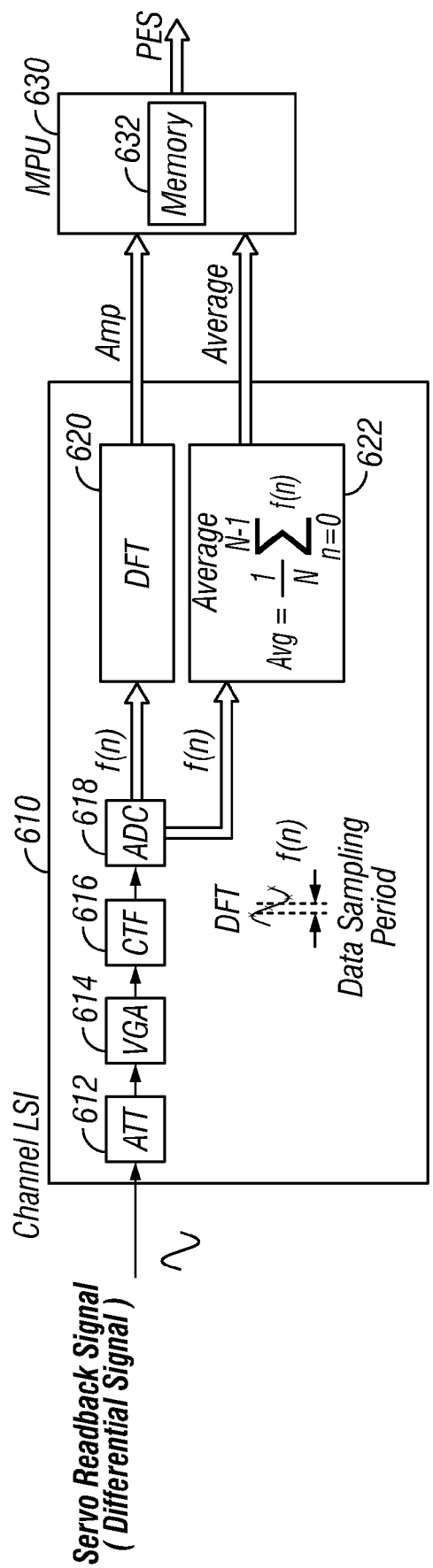
FIG. 7 is a block diagram of the hardware for calculating the PES from the servo readback signal.

FIG. 7 shows one example of the hardware for demodulation of the servo readback signal into the PES. The demodulation operation outputs the PES, which is a value proportional to the read head radial distance from the track centerline. The demodulation method includes amplitude measurement of the readback signal (the AC component), average measurement of the readback signal (the DC component), calculation of mPES and sPES, and final calculation of the PES. This is based on digital sampling and discrete Fourier Transform (DFT) calculation. In this example, data sampling, the DFT function, and the amplitude averaging is performed in the data channel large-scale read/write channel integrated circuit chip (LSI) 610, corresponding to the R/W electronics block 113 (FIG. 1A), and mPES, sPES and final PES calculations are performed in the microprocessor (MPU) 630, corresponding to servo electronics 112 and controller electronics 115 (FIG. 1A). However, all of the calculations may be performed by a single digital signal processor (DSP) or microprocessor with associated memory, like memory 632 associated with MPU 630, for storing computer program instructions for performing the calculations.

The servo readback signal (like that shown in FIG. 4C) goes to the channel LSI 610 and is input to the attenuator (ATT) 612. ATT 612 roughly adjusts the input signal amplitude in the adjustable signal range of the variable gain amplifier (VGA) 614. VGA 614 then adjusts the input signal amplitude in some pre-defined amplitude range. The continuous time filter (CTF) 616 is a low-pass filter that band limits higher-frequency noise prior to sampling. Then the signals are sampled at the constant sampling rate, and converted to digital by analog-to-digital converter (ADC) 618.

Then the DFT is performed for the sampled digital data at DFT block 620 to calculate the primary frequency. This is given by the following:

$$F_1 = \left(\frac{1}{N}\right)\sum_{n=0}^{N-1} f(n)\cos\left(\frac{2\pi n}{N}\right) - j\left(\frac{1}{N}\right)\sum_{n=0}^{N-1} f(n)\sin\left(\frac{2\pi n}{N}\right) \quad \text{Equation (3)}$$

where j: imaginary unit f(n): sampled readback signal

N: number of samples per cycle of the readback signal

M: total sampling number (usually a multiple of N)

The sine and cosine components are as follows:

$$\cos 1 = \sum_{n=0}^{M-1} f(n)\cos\left(\frac{2\pi n}{N}\right) \quad \text{Equation (4)}$$

$$\sin 1 = -\sum_{n=0}^{M-1} f(n)\cos\left(\frac{2\pi n}{N}\right) \quad \text{Equation (5)}$$

The number "M" is the total sampling number, and is usually set to a multiple of "N". By choosing a large number for M, the phase measurements can be averaged to reduce the noise. For example, if there are 6 stripes in each field, and N=8 data samples per one cycle of the readback signal, then M can be equal to (6/2)*8=24.

After calculating the sine and cosine components, the amplitude of the readback signal in the sync pattern can be calculated as follows:

$$\text{Amp\_Sync} = \sqrt{\sin 1^2 + \cos 1^2} \quad \text{Equation (6)}$$

The readback signal DC offset is measured by calculating the simple average of sampled data in each field according to the following:

$$Avg = \left(\frac{1}{M}\right)\sum_{n=0}^{M-1} f(n) \quad \text{Equation (7)}$$

This is depicted in FIG. 7 as block 622.

Figure 8:
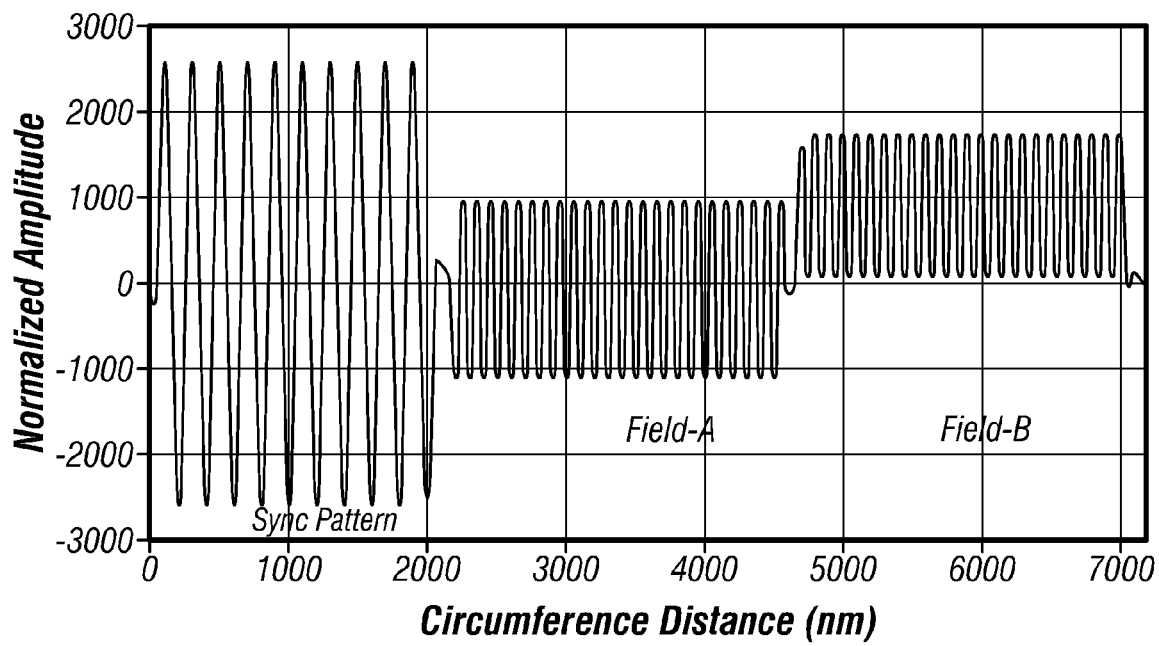
FIG. 8 is an example of the readback signal from the sync pattern, Field-A, and Field-B.

FIG. 8 shows an example of the readback signal from the sync pattern, Field-A, and Field-B, for a pattern where there are 48 stripes per field, the islands have a rectangular shape with a radial height of 55 nm and a circumferential width of ¼*Ii, Tp=39 nm, Ii=100 nm, and the data is sampled 8 times per readback cycle.

Figure 9:
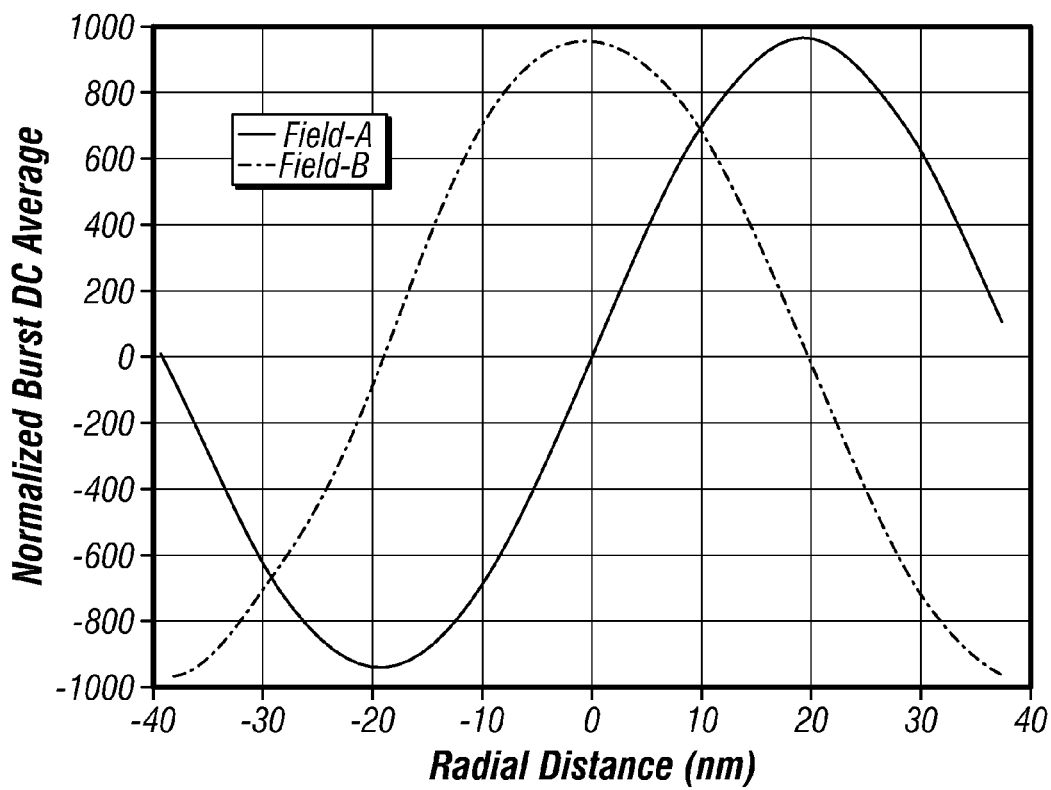
FIG. 9 is an example of the readback signal average amplitude measurement from Fields A and B.
Figure 10:
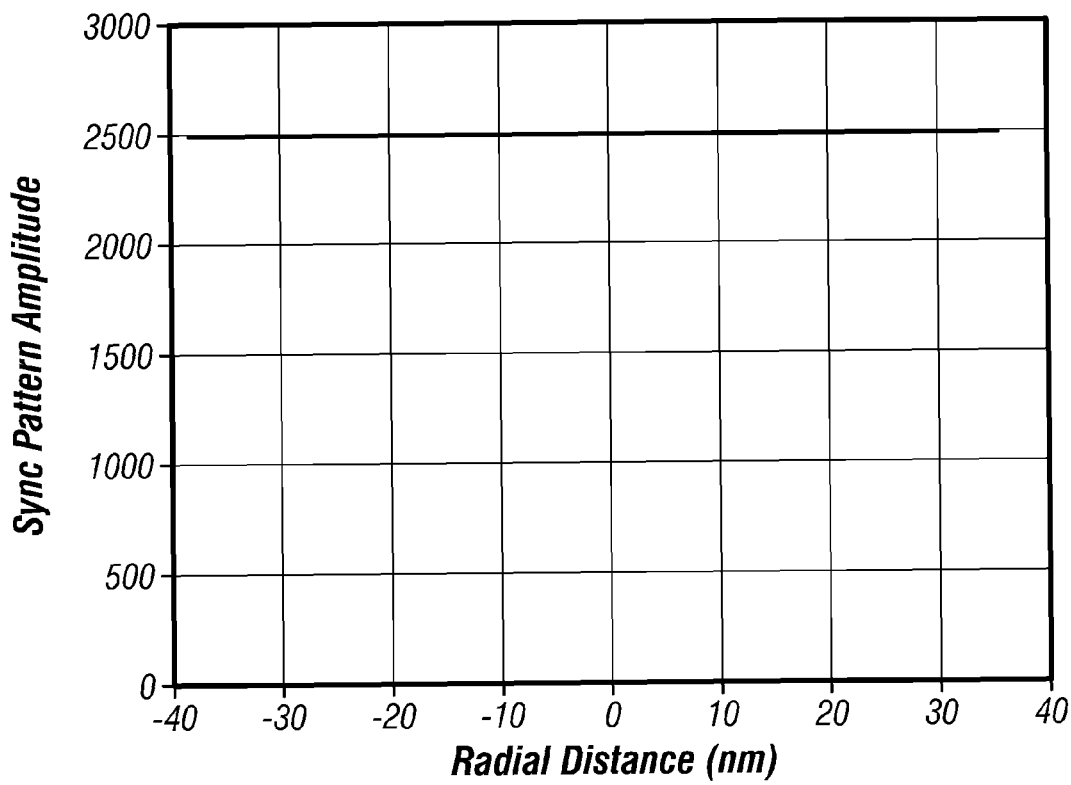
FIG. 10 is a graph of the calculated amplitude from the synchronization pattern in the readback signal.

FIG. 9 shows an example of the readback signal average measurement from Fields A and B for the same pattern as FIG. 8. The horizontal axis is the read head radial position, where "0" corresponds to the track centerline. The readback signal average is almost linear around the track centerline in Field-A (near 0), and almost linear around the midpoint between track centerlines in Field-B (near +/−20 nm). FIG. 10 shows an example of the sync pattern amplitude measurement (Equation (6)). The sync pattern amplitude is constant across the entire track width.

Figure 11:
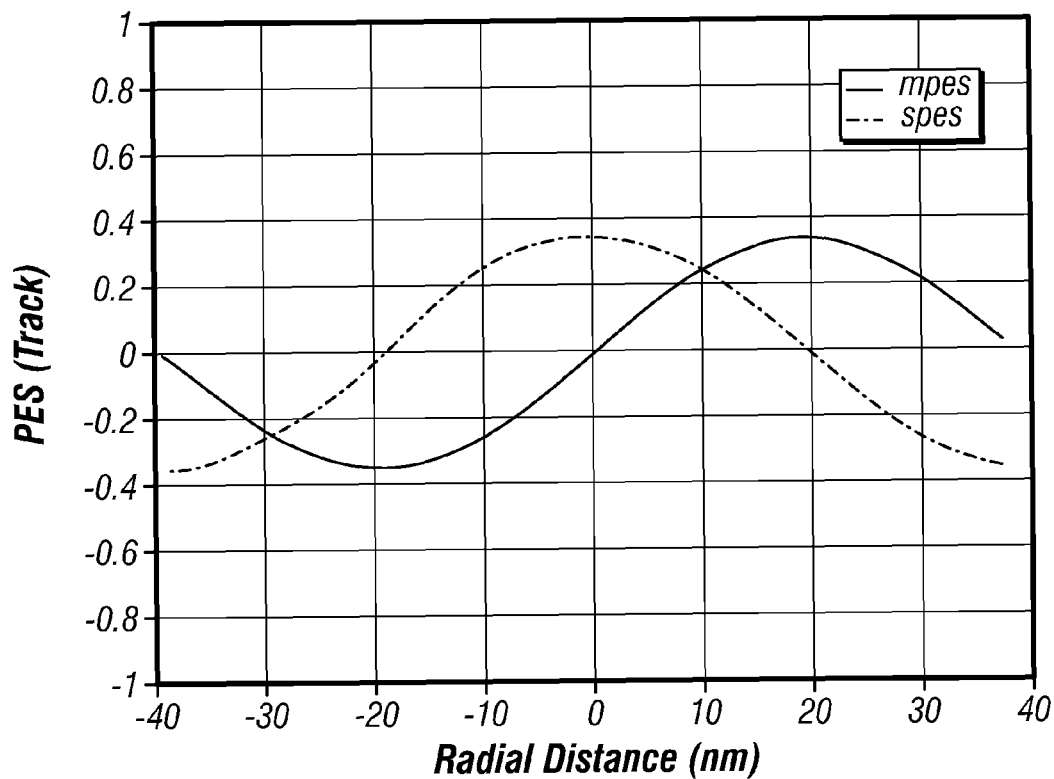
FIG. 11 is a graph of calculated main PES (mPES) and substitute PES (sPES) as a function of radial distance from the track centerline.

The next step is calculating mPES and sPES in MPU 630 from Equations (1) and (2). The PES values in these equations are normalized by the use of "Amp_Sync". Thus a PES value of 1 corresponds to one track pitch. FIG. 11 shows the calculated values of mPES and sPES as a function of radial distance from the track centerline for the same pattern as FIG. 8 and wherein "gain_h" is 0.9028.

Figure 12:
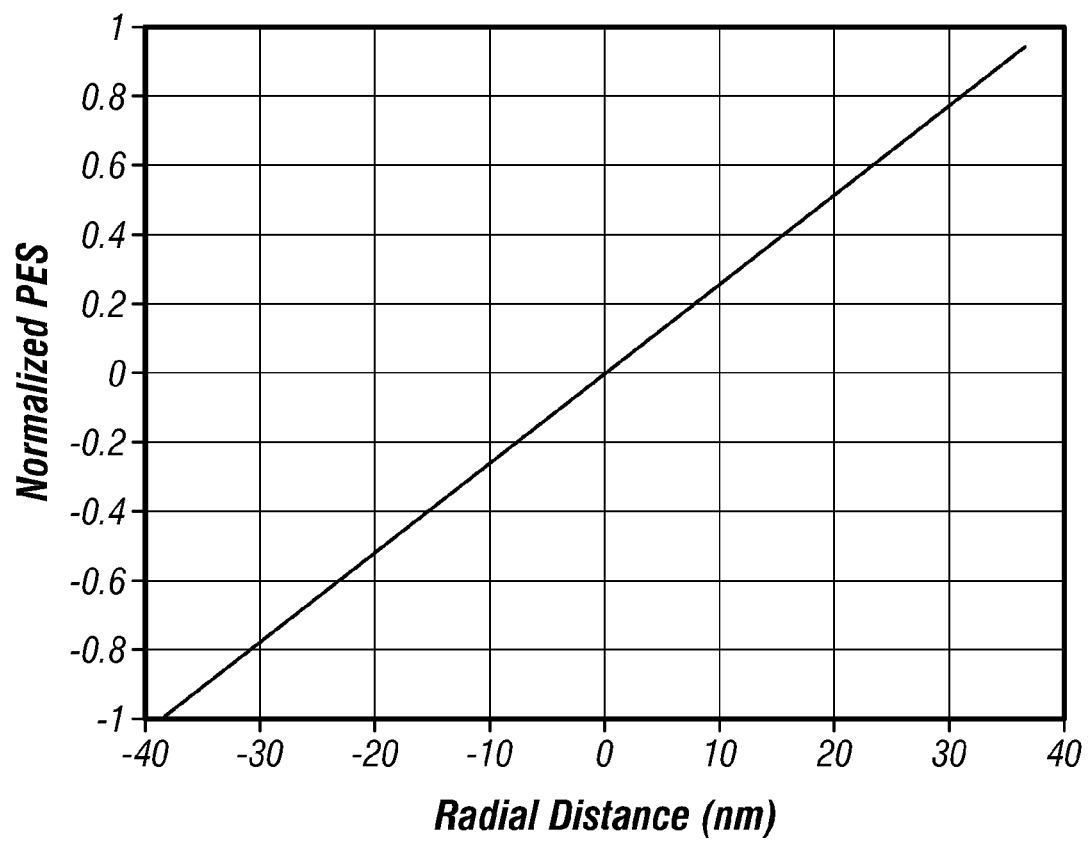
FIG. 12 is a graph of normalized PES as a function of radial distance from the track centerline.

For the final PES calculation, one or the other of the calculated mPES and sPES values is selected, depending on the read head radial location. For the case where the island height equals the single track pitch Tp, mPES is proportional to the read head offset from the track centerline, and sPES is proportional to the read head offset from the midpoint of two track centerlines. The PES to be used is selected from either the mPES or sPES, depending on which one has the lower absolute value. For example, if the absolute value of mPES is less than sPES, this indicates that the read head is located closer to the track centerline. Conversely, if the absolute value of sPES is less than mPES, this indicates that the read head is located closer to the midpoint between two adjacent track centerlines. The sign of the selected mPES or sPES is then multiplied by −1 if the slope of the selected mPES or sPES curve is negative for that value. For example, referring to FIG. 11, if the read head is located at +5 nm, the mPES has an absolute value of about 0.15 and the sPES has an absolute value of about 0.35, so mPES is selected. Also the slope of mPES is positive, so the mPES value is not multiplied by −1. Similarly, if the read head is located at −15 nm, the mPES has an absolute value of about 0.35 and the sPES has an absolute value of about 0.10, so sPES is selected. Also the slope of sPES is positive, so the sPES value is multiplied by −1. The slope of mPES and sPES can also be determined from the track ID (TID), i.e., whether the TID is odd or even. This can be understood from the mPES sine wave pattern of FIG. 11, which shows that at one track centerline (radial distance 0 nm) the slope is positive and at the next track centerline (radial distance 39 nm) the slope is negative, so that the slope is positive for every other track (e.g, even-numbered TIDs) and negative for every other track (e.g, odd-numbered TIDs). Finally, if the selected PES is the sPES value, then a value corresponding to the one-half track constant offset is summed (added or subtracted) with the PES. For example, if one track corresponds to a PES of 1 then a constant offset value of 0.5, corresponding to one-half track, is summed with the PES. FIG. 12 shows the final PES demodulation result.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
   a recording layer of magnetizable material for the recording of data in a plurality of generally concentric circular data tracks; and
   a plurality of nondata servo sectors extending generally radially across a plurality of the data tracks, the servo sectors comprising (a) a pattern of generally radially directed generally equally angularly spaced magnetized marks separated by nonmagnetic spaces, and (b) two and only two angularly spaced position error signal (PES) fields, each of the first and second PES fields comprising generally radially directed generally equally angularly spaced magnetized stripes separated by nonmagnetic spaces, each stripe comprising a plurality of discrete radially-spaced islands separated by nonmagnetic spaces, wherein the islands in the second PES field are shifted radially relative to the islands in the first PES field, and wherein a plurality of alternate stripes in the along-the-track direction in each field are magnetized in a first direction and the stripes between said alternate stripes in each field are magnetized in a second direction substantially antiparallel to said first direction.

2. The disk of claim 1 wherein the circular data tracks are radially spaced apart by a track pitch (Tp) radial spacing and wherein the radial shift of the islands in the second PES field is approximately one-half Tp.

3. The disk of claim 2 wherein each of the islands has a radial height of approximately Tp.

4. A magnetic recording disk comprising:
   a recording layer of magnetizable material for the recording of data in a plurality of generally concentric circular data tracks, each track having a track centerline and the track centerlines having a track pitch (Tp) radial spacing; and
   a plurality of nondata servo sectors extending generally radially across a plurality of the data tracks, the servo sectors comprising (a) a synchronization pattern of generally radially directed generally equally angularly spaced magnetized marks separated by nonmagnetic spaces, (b) a first field comprising generally radially directed generally equally angularly spaced magnetized stripes separated by nonmagnetic spaces, each stripe comprising a plurality of discrete islands, each island having a radial height of approximately Tp and being centered approximately at a track centerline, and (c) a second field angularly spaced from said first field and comprising generally radially directed generally equally angularly spaced magnetized stripes separated by nonmagnetic spaces, each stripe comprising a plurality of discrete islands, each island having a radial height of approximately Tp and being centered approximately at the midline between two adjacent track centerlines, wherein a plurality of alternate stripes in the along-the-track direction in each field are magnetized in a first direction and the stripes between said alternate stripes in each field are magnetized in a second direction substantially antiparallel to said first direction.

5. The disk of claim 4 wherein the angular spacing of the stripes in the first field is the same as the angular spacing of the stripes in the second field.

6. The disk of claim 5 wherein the angular spacing of the marks in the synchronization pattern is the same as the angular spacing of the stripes in the first and second fields.

7. The disk of claim 5 wherein the angular spacing between the first and second fields is an integer multiple of the angular spacing of the stripes.

8. The disk of claim 4 wherein the angular spacing between the stripes in each field corresponds to an along-the-track interval (Ii) between islands that is proportional to the radial location of the islands, and wherein the along-the-track width of the islands is less than about one-half Ii.

9. The disk of claim 4 wherein each of the islands has a shape selected from generally rectangular and generally circular.

10. The disk of claim 4 wherein said first and second directions are substantially parallel to the plane of the recording layer.

11. The disk of claim 4 wherein said first and second directions are substantially perpendicular to the plane of the recording layer.

12. The disk of claim 4 wherein the data tracks are patterned into discrete data islands of magnetizable material separated by nonmagnetic spaces.

13. The disk of claim 4 wherein the data tracks are continuous magnetizable material of the recording layer.

14. The disk of claim 4 wherein the data tracks are discrete data tracks of continuous magnetizable material of the recording layer separated by concentric nonmagnetic guard bands.

15. A patterned-media perpendicular magnetic recording disk comprising:
   a substrate; and
   a recording layer of magnetizable material on the substrate and patterned into
      (a) a plurality of generally concentric circular data tracks, each track having a track centerline and the track centerlines having a track pitch (Tp) radial spacing, and each data track containing discrete data islands of magnetizable material; and (b) a plurality of nondata servo sectors extending generally radially across a plurality of the data tracks, the servo sectors comprising (i) a synchronization pattern of generally radially directed generally equally angularly spaced magnetized marks separated by nonmagnetic spaces, (ii) a first field comprising generally radially directed magnetized stripes separated by nonmagnetic spaces, each stripe comprising a plurality of discrete islands, each island having a radial height of approximately Tp and being centered approximately at a track centerline, and (iii) a second field angularly spaced from said first field and comprising generally radially directed magnetized stripes separated by nonmagnetic spaces, each stripe comprising a plurality of discrete islands, each island having a radial height of approximately Tp and being centered approximately at the midline between two adjacent track centerlines; wherein a plurality of alternate stripes in the along-the-track direction in each field are magnetized in a first direction generally perpendicular to the recording layer and the stripes between said alternate stripes in each field are magnetized in a second direction substantially antiparallel to said first direction, and wherein the stripes in the first and second fields have substantially the same angular spacing.

16. The disk of claim 15 wherein the angular spacing between the first and second fields is an integer multiple of the angular spacing of the stripes.

17. The disk of claim 15 wherein the along-the-track width of the islands is generally proportional to the radial location of the islands.

18. The disk of claim 15 wherein each of the islands has a shape selected from generally rectangular and generally circular.

19. A magnetic recording disk drive comprising:

a patterned-media perpendicular magnetic recording disk comprising:
  a substrate; and
  a recording layer of magnetizable material on the substrate and patterned into
    (a) a plurality of generally concentric circular data tracks, each track having a track centerline and the track centerlines having a track pitch (Tp) radial spacing, and each data track containing discrete data islands of magnetizable material; and
    (b) a plurality of nondata servo sectors extending generally radially across a plurality of the data tracks, the servo sectors comprising (i) a synchronization pattern of generally radially directed generally equally angularly spaced magnetized marks separated by nonmagnetic spaces, (ii) a first field comprising generally radially directed magnetized stripes separated by nonmagnetic spaces, each stripe comprising a plurality of discrete islands, each island having a radial height of approximately Tp and being centered approximately at a track centerline, and (iii) a second field angularly spaced from said first field and comprising generally radially directed magnetized stripes separated by nonmagnetic spaces, each stripe comprising a plurality of discrete islands, each island having a radial height of approximately Tp and being centered approximately at the midline between two adjacent track centerlines; wherein a plurality of alternate stripes in the along-the-track direction in each field are magnetized in a first direction generally perpendicular to the recording layer and the stripes between said alternate stripes in each field are magnetized in a second direction substantially antiparallel to said first direction, and wherein the stripes in the first and second fields have substantially the same angular spacing;

a write head that writes data in the data islands of the data tracks;

a read head that reads data from the data islands in the data tracks and detects the magnetized marks in the synchronization pattern and the magnetized islands in the first and second fields, the read head generating a servo signal from the marks and islands as the disk rotates;

an actuator connected to the heads for positioning the heads to different data tracks and maintaining the heads on the tracks;

servo electronics responsive to the servo signal for generating a position error signal (PES) for controlling the actuator, the servo electronics including a processor for calculating (a) the amplitude of the servo signal from the synchronization pattern, (b) the average amplitudes of the servo signal from the islands in the first and second fields, and (c) the PES from said calculated amplitudes; and memory associated with the processor and containing computer program instructions for performing the processor-implemented steps of:
  calculating a main PES (mPES) from the calculated average amplitude of the servo signal from the islands in the first field;
  calculating a substitute PES (sPES) from the calculated average amplitude of the servo signal from the islands in the second field;
  selecting one of the mPES and the sPES as the PES depending on which has the lower absolute value;
  if the PES is a negative value multiplying the PES by −1; and
  if the sPES is selected as the PES, summing a constant offset value with the PES.

* * * * *